US011574017B2

(12) United States Patent
Boxwell et al.

(10) Patent No.: US 11,574,017 B2
(45) Date of Patent: Feb. 7, 2023

(54) SUB-QUESTION RESULT MERGING IN QUESTION AND ANSWER (QA) SYSTEMS

(71) Applicant: International Business Machines Corporation, Armonk, NY (US)

(72) Inventors: Stephen Arthur Boxwell, Franklin, OH (US); Keith Gregory Frost, Delaware, OH (US); Stanley John Vernier, Grove City, OH (US); Kyle Matthew Brake, Westerville, OH (US)

(73) Assignee: International Business Machines Corporation, Armonk, NY (US)

(*) Notice: Subject to any disclaimer, the term of this patent is extended or adjusted under 35 U.S.C. 154(b) by 463 days.

(21) Appl. No.: 16/845,025

(22) Filed: Apr. 9, 2020

(65) Prior Publication Data

US 2021/0319066 A1 Oct. 14, 2021

(51) Int. Cl.
*G06F 16/9032* (2019.01)
*G06F 16/901* (2019.01)
*G06F 40/205* (2020.01)

(52) U.S. Cl.
CPC ...... *G06F 16/90332* (2019.01); *G06F 16/901* (2019.01); *G06F 40/205* (2020.01)

(58) Field of Classification Search
None
See application file for complete search history.

(56) References Cited

U.S. PATENT DOCUMENTS

| | | | |
|---|---|---|---|
| 7,849,077 B2 | 12/2010 | Liao et al. | |
| 8,601,030 B2 | 12/2013 | Bagchi et al. | |
| 8,738,362 B2 | 5/2014 | Ferrucci et al. | |
| 9,063,975 B2 | 6/2015 | Isensee et al. | |
| 9,659,005 B2 | 5/2017 | Ramish | |
| 10,019,513 B1 | 7/2018 | Koren et al. | |
| 10,133,808 B2 | 11/2018 | Brown et al. | |
| 10,180,964 B1 | 1/2019 | Baker et al. | |
| 10,339,453 B2* | 7/2019 | Balani | G06N 5/025 |

(Continued)

OTHER PUBLICATIONS

High, Rob, "The Era of Cognitive Systems: An Inside Look at IBM Watson and How it Works", IBM Corporation, Redbooks, Dec. 12, 2012, 16 pages.

(Continued)

*Primary Examiner* — Thu N Nguyen

(74) *Attorney, Agent, or Firm* — Stephen J. Walder, Jr.; Brian Welle

(57) ABSTRACT

An input question enhancement mechanism is provided for merging sub-question results in Question and Answer (QA) systems in order to answer an input question submitted from a user. A plurality of sub-questions associated with the input question is identified. Responsive to submitting the set of questions to a QA pipeline of the QA system, a set of answers and a set of passages related to the set of answers corresponding to each of the plurality of sub-questions are received. A mapping is applied to the set of passages to form a consolidated set of passages. The set of answers is then merged into the mapping so as to generate a consolidated set of answers. A factoid question response report is generated with answers from the consolidated set of answers and passages from the consolidated set of passages. The factoid question response report is then provided to the user.

18 Claims, 6 Drawing Sheets

(56) References Cited

U.S. PATENT DOCUMENTS

| | | |
|---|---|---|
| 2011/0125734 A1 | 5/2011 | Duboue et al. |
| 2014/0141401 A1* | 5/2014 | Agarwal ................. G06N 5/02 434/359 |
| 2015/0370854 A1 | 12/2015 | Cao et al. |
| 2016/0246875 A1* | 8/2016 | Brown ................. G06F 16/284 |
| 2019/0065583 A1 | 2/2019 | Bull et al. |
| 2019/0163838 A1 | 5/2019 | Ramachandra et al. |

OTHER PUBLICATIONS

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

* cited by examiner

SUB-QUESTION RESULT MERGING IN QUESTION AND ANSWER (QA) SYSTEMS

BACKGROUND

The present application relates generally to an improved data processing apparatus and method and more specifically to mechanisms for merging sub-question results in Question and Answer (QA) systems in order to answer an input question.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided to implement an input question enhancement mechanism for merging sub-question results in Question and Answer (QA) systems in order to answer an input question submitted from a user. The illustrative embodiment identifies a plurality of sub-questions associated with the input question. The illustrative embodiment receives a set of answers and a set of passages related to the set of answers corresponding to each of the plurality of sub-questions in response to submitting the set of questions to a QA pipeline of the QA system. The illustrative embodiment applies a mapping to the set of passages to form a consolidated set of passages. The illustrative embodiment merges the set of answers into the mapping so as to generate a consolidated set of answers. The illustrative embodiment generates a factoid question response report with answers from the consolidated set of answers and passages from the consolidated set of passages. The illustrative embodiment provides the factoid question response report to the user.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
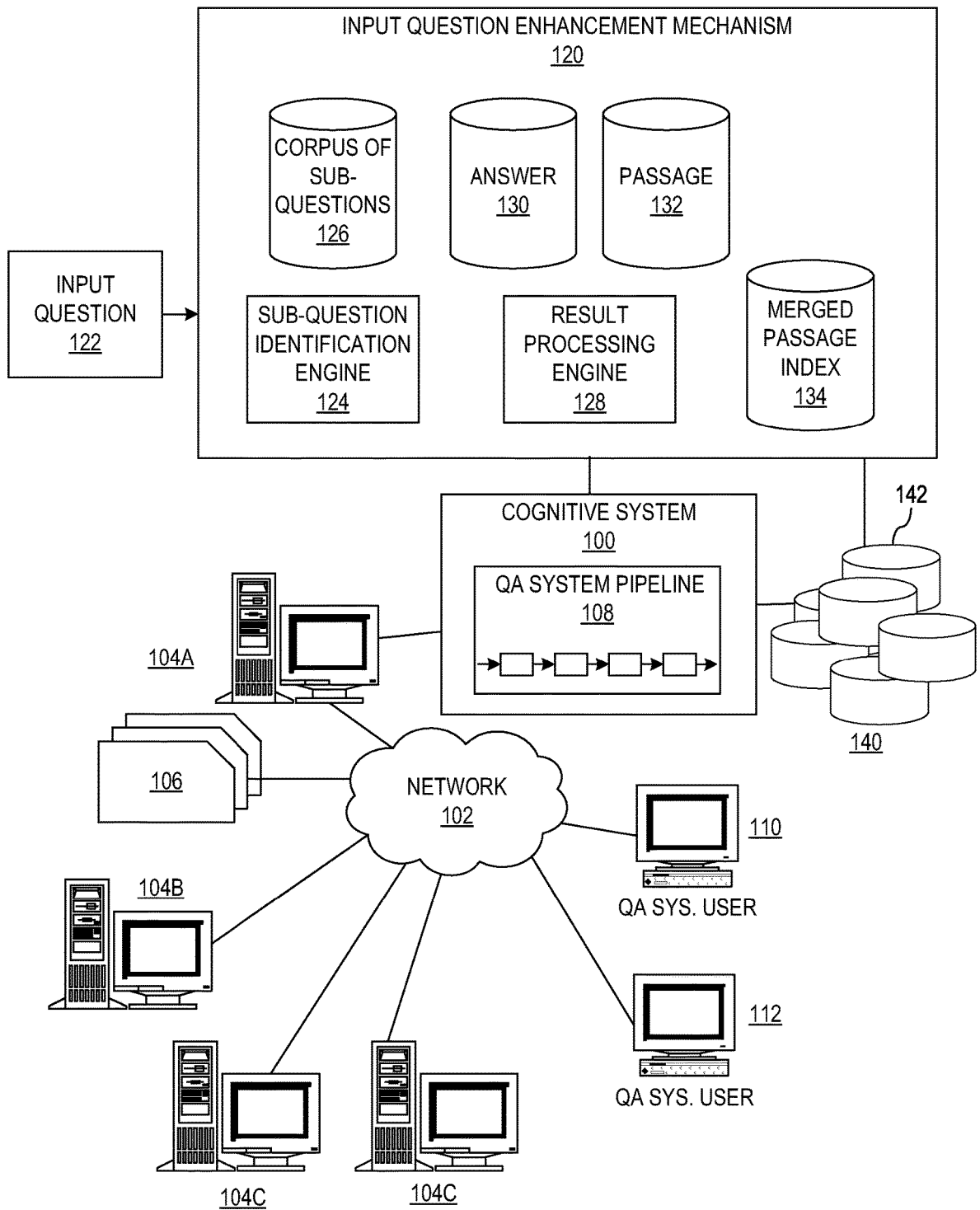
FIG. 1 depicts a schematic diagram of one illustrative embodiment of a cognitive system in a computer network.

In the question-answering task, overly broad questions may be difficult to answer. For example, an input question like "Who are Dennis Rodman's friends?" would be easy to answer for a Question and Answer (QA) system to answer if a corpus of reference documents comprised a phrase that states "Dennis Rodman's friends are Michael Jordan and Moses Malone." However, the QA system might struggle with differently phrased reference documents rich with pragmatic implications, such as "Dennis Rodman traveled to North Korea to visit Kim Jong-Un several times this year."

In order to address the issue of dealing with differently phrased reference documents rich with pragmatic implications in order to answer such input questions, the illustrative embodiments provide mechanisms for domain adaptation techniques that may be used to map broad references within a corpus of reference documents to a set of specific questions, where the correct answers to the specific questions are assumed to be correct answers for to the input question. That is, the illustrative embodiment employs a set of sub-questions that are identified as being related to the input question. The QA system then operates to answer each sub-question separately and merge the results, i.e. the answer to each sub-question into a single report so the most relevant information is easily accessible. By performing such operations, the illustrative embodiments improve the answering capabilities of QA systems such that differently phrased reference documents rich with pragmatic implications from the corpus of reference documents provide an accurate answer to the input question.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
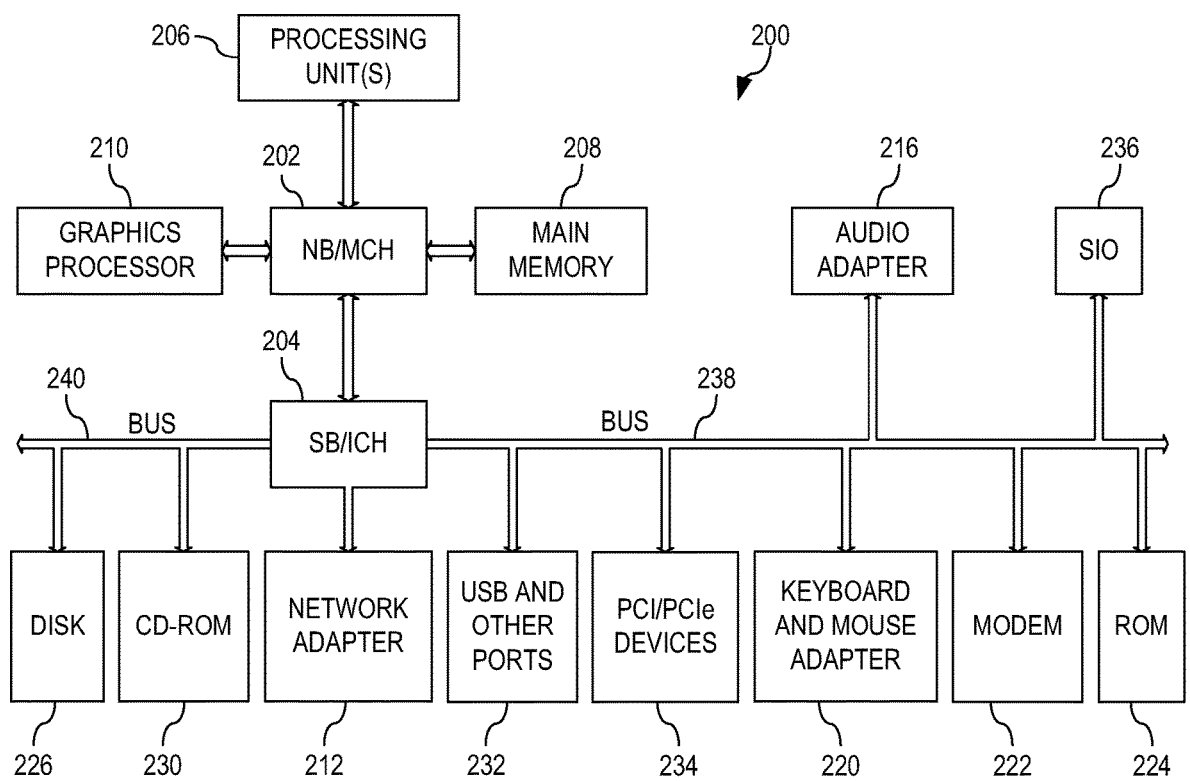
FIG. 2 is a block diagram of an example data processing system in which aspects of the illustrative embodiments are implemented.
Figure 3:
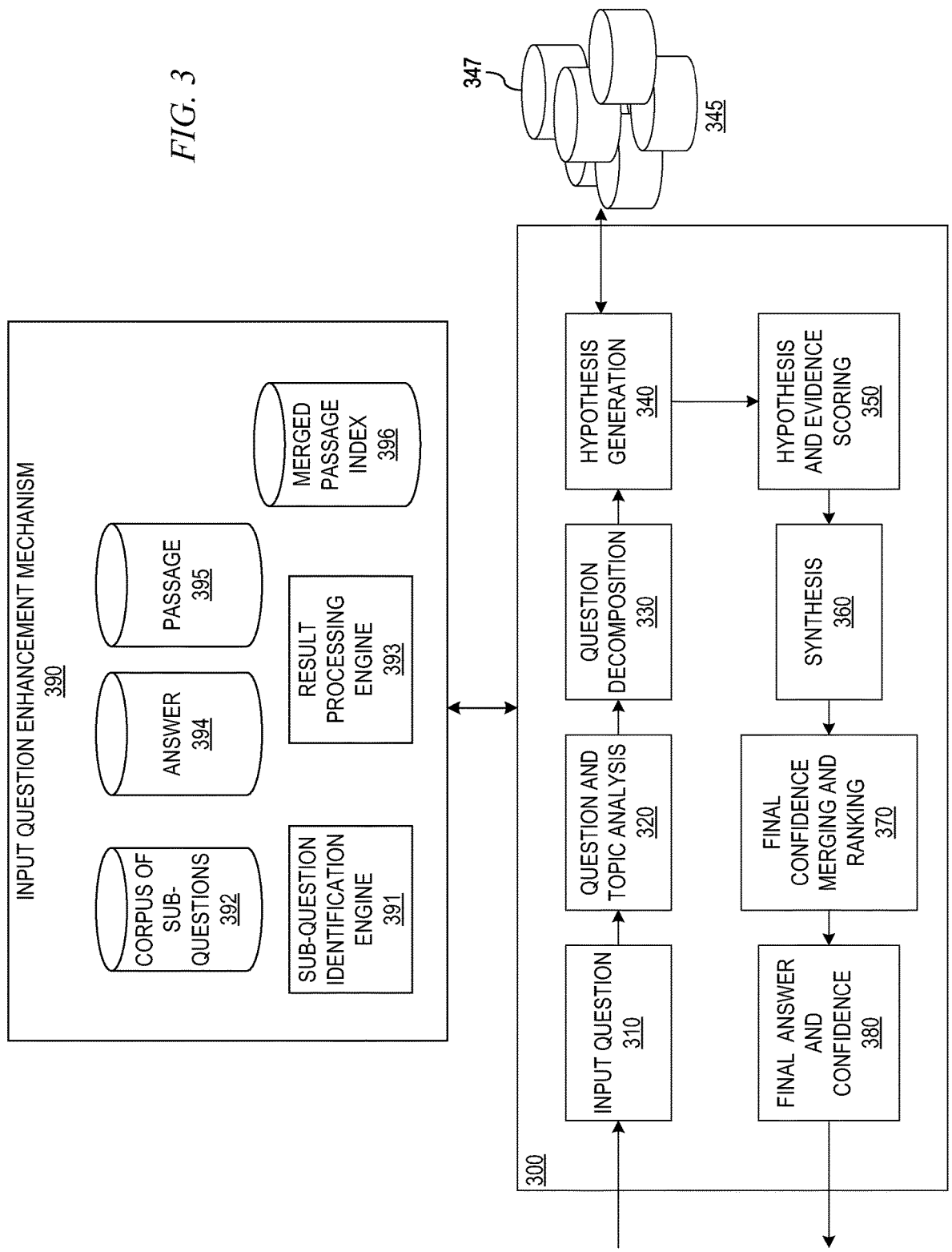
FIG. 3 illustrates a cognitive system processing pipeline for processing a natural language input to generate a response or result in accordance with one illustrative embodiment.

As noted above, the present invention provides mechanisms for merging sub-question results in Question and Answer (QA) systems in order to answer an input question. Thus, the illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system for merging sub-question results in order to answer an input question (also referred to as a request) submitted to a Question and Answer (QA) system, which implements a request processing pipeline, such as a Question Answering (QA) pipeline (also referred to as a Question/Answer pipeline or Question and Answer pipeline) for example, request processing methodology, and request processing computer program product with which the mechanisms of the illustrative embodiments are implemented. These requests may be provided as structure or unstructured request messages, natural language questions, or any other suitable format for requesting an operation to be performed by the cognitive system. As described in more detail hereafter, the particular application that is implemented in the cognitive system of the present invention is an application for dealing with differently phrased reference documents rich with pragmatic implications in order to answer a specific input question.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests (or questions in implementations using a QA pipeline), depending on the desired implementation. For example, in some cases, a first request processing pipeline may be trained to operate on input requests directed to historical figures. In other cases, for example, the request processing pipelines may be configured to provide different types of cognitive functions or support different types of applications, such as one request processing pipeline being used for answering question directed to sports figures, medical diagnoses, legal matters, etc.

Moreover, each request processing pipeline may have its own associated corpus or corpora that they ingest and operate on, e.g., one corpus for historical domain related documents, another corpus for sports domain related documents, yet another corpus for medical domain related documents, and an additional corpus for law domain related documents, in the above examples. In some cases, the request processing pipelines may each operate on the same domain of input questions but may have different configurations, e.g., different annotators or differently trained annotators, such that different analysis and potential answers are generated. The cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

As noted above, one type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "Who are Dennis Rodman's friends?", the cognitive system may instead receive a request of "identify friends of Dennis Rodman," or the like. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the particular implementation.

As will be discussed in greater detail hereafter, the illustrative embodiments may be integrated in, augment, and extend the functionality of these QA pipeline, or request processing pipeline, mechanisms of a cognitive system with regard to merging sub-question results in Question and Answer (QA) systems in order to answer an input question. That is, the illustrative embodiment employs a set of sub-questions that are identified as being related to the input question received as a request from a user. The QA system then operates to answer each sub-question separately and merge the results, i.e. the answer to each sub-question into a single report so the most relevant information is easily accessible. By performing such operations, the illustrative embodiments improve the answering capabilities of QA systems such that differently phrased reference documents rich with pragmatic implications from the corpus of reference documents provide an accurate answer to the input question.

Thus, it is important to first have an understanding of how cognitive systems and question and answer creation in a cognitive system implementing a QA pipeline is implemented before describing how the mechanisms of the illustrative embodiments are integrated in and augment such cognitive systems and request processing pipeline, or QA pipeline, mechanisms. It should be appreciated that the mechanisms described in FIGS. 1-3 are only examples and are not intended to state or imply any limitation with regard to the type of cognitive system mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

- Navigate the complexities of human language and understanding,
- Ingest and process vast amounts of structured and unstructured data,
- Generate and evaluate hypothesis,
- Weigh and evaluate responses that are based only on relevant evidence,
- Provide situation-specific advice, insights, and guidance, Improve knowledge and learn with each iteration and interaction through machine learning processes, Enable decision making at the point of impact (contextual guidance), Scale in proportion to the task, Extend and magnify human expertise and cognition, Identify resonating, human-like attributes and traits from natural language, Deduce various language specific or agnostic attributes from natural language, High degree of relevant recollection from data points (images, text, voice) (memorization and recall), Predict and sense with situational awareness that mimic human cognition based on experiences, and/or Answer questions based on natural language and specific evidence.

In one aspect, cognitive systems provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a request processing pipeline 108, which in some embodiments may be a question answering (QA) pipeline, in a computer network 102. For purposes of the present description, it will be assumed that the request processing pipeline 108 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 100 is implemented on one or more computing devices 104A-D (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on computing device 104A only, but as noted above the cognitive system 100 may be distributed across multiple computing devices, such as a plurality of computing devices 104A-D. The network 102 includes multiple computing devices 104A-D, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 enables question processing and answer generation (QA) functionality for one or more cognitive system users via their respective computing devices 110-112. In other embodiments, the cognitive system 100 and network 102 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, subsystems, and/or devices other than those that are depicted herein.

The cognitive system 100 is configured to implement a request processing pipeline 108 that receive inputs from various sources. The requests may be posed in the form of a natural language question, natural language request for information, natural language request for the performance of a cognitive operation, or the like. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104A-D on the network 102 include access points for content creators and cognitive system users. Some of the computing devices 104A-D include devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus or corpora of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input questions/requests to the cognitive system 100 that are answered/processed based on the content in the corpus or corpora of data 106. In one embodiment, the questions/requests are formed using natural language. The cognitive system 100 parses and interprets the question/request via a pipeline 108, and provides a response to the cognitive system user, e.g., cognitive system user 110, containing one or more answers to the question posed, response to the request, results of processing the request, or the like. In some embodiments, the cognitive system 100 provides a response to users in a ranked list of candidate answers/responses while in other illustrative embodiments, the cognitive system 100 provides a single final answer/response or a combination of a final answer/response and ranked listing of other candidate answers/responses.

The cognitive system 100 implements the pipeline 108 which comprises a plurality of stages for processing an input question/request based on information obtained from the corpus or corpora of data 106. The pipeline 108 generates answers/responses for the input question or request based on the processing of the input question/request and the corpus or corpora of data 106. The pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives an input question or request which it then parses to extract the major features of the question/request, which in turn are then used to formulate queries that are applied to the corpus or corpora of data 106. Based on the application of the queries to the corpus or corpora of data 106, a set of hypotheses, or candidate answers/responses to the input question/request, are generated by looking across the corpus or corpora of data 106 for portions of the corpus or corpora of data 106 (hereafter referred to simply as the corpus 106) that have some potential for containing a valuable response to the input question/response (hereafter assumed to be an input question). The pipeline 108 of the IBM Watson™ cognitive system then performs deep analysis on the language of the input question and the language used in each of the portions of the corpus 106 found during the application of the queries using a variety of reasoning algorithms.

The scores obtained from the various reasoning algorithms are then weighted against a statistical model that summarizes a level of confidence that the pipeline 108 of the IBM Watson™ cognitive system 100, in this example, has regarding the evidence that the potential candidate answer is inferred by the question. This process is be repeated for each of the candidate answers to generate ranked listing of candidate answers which may then be presented to the user that submitted the input question, e.g., a user of client computing device 110, or from which a final answer is selected and presented to the user. More information about the pipeline 108 of the IBM Watson™ cognitive system 100 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the cognitive system 100 from a client device may be posed in the form of a natural language question, the illustrative embodiments are not limited to such. Rather, the input question may in fact be formatted or structured as any suitable type of request which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis.

In the context of the present invention, cognitive system 100 may provide a cognitive functionality for merging sub-question results in Question and Answer (QA) systems in order to answer an input question. For example, depending upon the particular implementation, the knowledge base expansion based operations may comprise, responsive to receiving an input question identifying a set of sub-questions related to the input question. Then, the QA system operates to answer the input question and each of the set of sub-questions separately using differently phrased reference documents rich with pragmatic implications thereby adapting the domain to which the questions are posed. The QA system then merges the results, i.e. the answer to the input question and each sub-question into a single report so the most relevant information is easily accessible. By performing such operations, the illustrative embodiments improve the answering capabilities of QA systems such that differently phrased reference documents rich with pragmatic implications from the corpus of reference documents provide an accurate answer to the input question.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing input question enhancement mechanism 120. Input question enhancement mechanism 120 receives input question 122 from a user. Sub-question identification engine 124 receives parsing information from a question and topic analysis stage of request processing pipeline 108, the parsing information identifying major features from the input question and a classification of the major features according to types, e.g., names, dates, or any of a plethora of other defined topics.

Utilizing this parsing information, sub-question identification engine 124 identifies a list of sub-questions from corpus of sub-questions 126 related to input question 122 based on the parsing information, thereby forming a set of questions to be posed to the corpus of data/information 140 in order to generate one or more hypotheses. The set of questions are generated in any known or later developed query language, such as the Structure Query Language (SQL), or the like. The set of questions are applied to one or more databases storing information about the electronic texts, documents, articles, websites, and the like, that make up the corpora of data/information 140. That is, these various sources themselves, different collections of sources, and the like, represent a different corpus 142 within the corpora 140. There may be different corpora 142 defined for different collections of documents based on various criteria depending upon the particular implementation. For example, different corpora may be established for different topics, subject matter categories, sources of information, or the like.

In conjunction with a hypothesis generation stage of request processing pipeline 108, each question of the set of questions is submitted to request processing pipeline 108 and result processing engine 128 stores a set of answers provided by request processing pipeline 108 in answer data structure 130 and a set of related passages related to the set of answers in passage data structure 132. Initially, answer data structure 130 and passage data structure 132 are empty. As result processing engine 128 adds an associated passage to passage data structure 132, result processing engine 128 determines whether the passage already exists in passage data structure 132. If result processing engine 128 determines that the associated passage already exists in passage data structure 132, then result processing engine 128 set that passage in passage data structure 132 to have the higher score between itself and the answer as well as any other answer associated with the passage. If result processing engine 128 determines that the associated passage fails to exist in passage data structure 132, result processing engine 128 adds the associated passage to passage data structure 132. Once all passages are added to passage data structure 132, result processing engine 128 sorts passage data structure 132 by score and generates a map m[x][y] that relates the question form the set of questions (x) and the passage associated with the answer to that question (y) of original passages to merged passage index 134.

In another operation, as result processing engine 128 adds each answer to answer data structure 130, result processing engine 128 updates each passage index for each answer occurrence of the answer to m[ai][pi], where ai is the index of the answer in answer data structure 130 and pi is the original passage index for this answer in merged passage index 134. If result processing engine 128 determines that an answer to a question from the set of questions already exists in answer data structure 130, result processing engine 128 determines whether a score associated with that answer being added is higher than the answer already existing in answer data structure 130. The score associated with each answer is provided by a hypothesis and evidence scoring stage and a synthesis stage of request processing pipeline 108. If result processing engine 128 determines that a score associated with the answer being added is higher, then result processing engine 128 sets the existing answer's score in answer data structure 130 to the higher score. If result processing engine 128 determines that the answer's score being added fails to be higher, then result processing engine 128 leaves the score of the existing answer as is. If result processing engine 128 determines that an answer to a question from the set of questions fails to exist in answer data structure 130, result processing engine 128 adds the answer with its score to answer data structure 130. Once all answers are added to answer data structure 130, result processing engine 128 sorts answer data structure 130 by score. Result processing engine 128 then generates a factoid question response report with answers from answer data structure 130 and passages from passage data structure 132. Result processing engine 128 then provides the factoid question response report to a confidence merging and ranking stage of request processing pipeline 108 so as to replace the normal operations provided by the confidence merging and ranking stage and thus, be utilized in a final set of candidate answers and confidence scores stage of request processing pipeline 108.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates an example of a cognitive system processing pipeline which, in the depicted example, is a question and answer (QA) system pipeline used to process an input question in accordance with one illustrative embodiment. As noted above, the cognitive systems with which the illustrative embodiments may be utilized are not limited to QA systems and thus, not limited to the use of a QA system pipeline. FIG. 3 is provided only as one example of the processing structure that may be implemented to process a natural language input requesting the operation of a cognitive system to present a response or result to the natural language input.

The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?", the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexities may be used to generate scores for candidate answers and evidence without departing from the spirit and scope of the present invention.

In the synthesis stage 360, the large number of scores generated by the various reasoning algorithms is synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, QA pipeline 300 is further augmented, in accordance with the mechanisms of the illustrative embodiments, to include logic implemented in specialized hardware, software executed on hardware, or any combination of specialized hardware and software executed on hardware, for implementing input question enhancement mechanism 390. As QA pipeline 300 receives input question 310 from a user, sub-question identification engine 391 receives parsing information from a question and topic analysis stage 320, the parsing information identifying major features from the input question and a classification of the major features according to types, e.g., names, dates, or any of a plethora of other defined topics.

Utilizing this parsing information, sub-question identification engine 391 identifies a list of sub-questions from corpus of sub-questions 392 related to input question 130 based on the parsing information, thereby forming a set of questions to be posed to the corpus of data/information 345 in order to generate one or more hypotheses. The set of questions are generated in any known or later developed query language, such as the Structure Query Language (SQL), or the like. The set of questions are applied to one or more databases storing information about the electronic texts, documents, articles, websites, and the like, that make up the corpora of data/information 345.

In conjunction with hypothesis generation stage 340, each question of the set of questions is applied to the corpus of data/information to generate results identifying potential hypotheses for answering the input question. That is, the application of the queries results in the extraction of portions of the corpus of data/information matching the criteria of the particular query. These portions of the corpus are then analyzed and used, during the hypothesis generation stage 340, to generate hypotheses for answering the question. These hypotheses are also referred to herein as "candidate answers" for the question. The hypothesis generation stage 340 provides these candidate answers and supporting passages to result processing engine 393. Result processing engine 393 stores a set of answers provided by hypothesis generation stage 340 in answer data structure 394 and stores the set of related passages related to the set of answers in passage data structure 395. Initially, answer data structure 394 and passage data structure 395 are empty. As result processing engine 393 adds an associated passage to passage data structure 395, result processing engine 393 determines whether the passage already exists in passage data structure 395. If result processing engine 393 determines that the associated passage already exists in passage data structure 395, then result processing engine 393 sets that passage in passage data structure 395 to have the higher score between itself and the answer as well as any other answer associated with the passage. If result processing engine 393 determines that the associated passage fails to exist in passage data structure 395, result processing engine 393 adds the associated passage to passage data structure 395 and sets a score between the associated passage and the answer associated with the passage to an initial value. Once all passages are analyzed, result processing engine 393 sorts passage data structure 395 by score and generates a map m[x][y] that relates the question form the set of questions (x) and the passage associated with the answer to that question (y) of original passages in merged passage index 396.

In another operation, as result processing engine 393 adds each answer to answer data structure 394, result processing engine 393 updates each passage index for each answer occurrence of the answer to m[ai][pi], where ai is the index of the answer in answer data structure 394 and pi is the original passage index for this answer in merged passage index 396. If result processing engine 393 determines that an answer to a question from the set of questions already exists in answer data structure 394, result processing engine 393 determines whether an assigned score associated with that answer being added is higher than the answer already existing in answer data structure 394. The score associated with each answer is provided by the hypothesis and evidence scoring stage 350 and the synthesis stage 360 of QA pipeline 300. If result processing engine 393 determines that a score associated with the answer being added is higher, then result processing engine 393 sets the existing answer's score in answer data structure 394 to the higher score. If result processing engine 393 determines that the answer's score being added fails to be higher, then result processing engine 393 leaves the score of the existing answer as is. If result processing engine 393 determines that an answer to a question from the set of questions fails to exist in answer data structure 394, result processing engine 393 adds the answer with its score to answer data structure 394. Once all answers are added to answer data structure 394, result processing engine 393 sorts answer data structure 394 by score. Result processing engine 393 then generates a factoid question response report with answers from answer data structure 394 and passages from passage data structure 395. Result processing engine 393 then provides the factoid question response report to the confidence merging and ranking stage 370 so as to replace the normal operations provided by the confidence merging and ranking stage 370 and thus, be utilized in a final set of candidate answers and confidence scores stage 380 to produce a final answer and confidence score, or final set of candidate answers and confidence scores, which are output to the submitter of the original input question via a graphical user interface or other mechanism for outputting information.

The following provides one example of the operation performed by input question enhancement mechanism 390. Responsive to receiving an input question 130 of "Who are Emanuel Macron's closest advisors?", sub-question identification engine 391 identifies from corpus of sub-questions 392 though domain adaptation efforts a series of more-specific sub-questions, where the correct answer to each sub-question is considered a valid answer to input question 130. The set of sub-questions being "Who is the Prime Minister of France?", "What cabinet ministers were appointed by Emanuel Macron?", and "Who served as a senior member of Emanuel Macron's campaigns?" Each of these sub-questions as well as possibly input question 130 is applied through hypothesis generation stage 340. For each question, hypothesis generation stage 340 provides an answer and related passages where the answer scheme is of the form {answer,score,[{passage,sentence,token} . . . ]}' and the passage scheme is of the form ' {passage, score} '.

Thus, responsive to the question "Who is the Prime Minister of France?", the answers are {Édouard Charles Philippe, 0.9, [{0, 0, 0}]}' and {Nicolas Hulot, 0.4, [{0, 1, 3}]}' and the associated passages are {Edouard Charles Philippe is the French prime minister. He met with Nicolas Hulot., 0.7}'. Responsive to the question "What cabinet ministers were appointed by Emanuel Macron?", the answers are {Bruno Le Maire, 0.85, [{0, 0, 2}]}', {Francois Bayrou, 0.80, [{0, 0, 4}]}', {Nicolas Hulot, 0.75, [{1, 0, 0}]}', and {Edouard Charles Philippe, 0.1, [{1, 0, 0}]}' and the associated passages are {Macron appointed Bruno Le Maire and Francois Bayrou as his economy minister and justice minister, respectively., 0.85}', {Nicolas Hulot dramatically quit Macron's cabinet on live radio., 0.6}', {Édouard Charles Philippe is the French prime minister. He met with Nicolas Hulot., 0.2}'. Responsive to the question "Who served as a senior member of Emanuel Macron's campaigns?", the answers are {Alexis Kohler, 0.5, [{0, 0, 0}]}' and {Elysée, 0.1, [{0, 0, 4}]}' and the associated passage is "{Alexis Kohler: Secretary-general at the Elysée, he has worked closely with Mr. Macron for several years and has long acted as his special adviser., 0.3}".

Responsive to receiving these results, results processing engine 393 merges and sorts the passages as described previously such that passage data structure 395 comprises '{Macron appointed Bruno Le Maire and Francois Bayrou as his economy minister and justice minister, respectively., 0.85}', '{Édouard Charles Philippe is the French prime minister. He met with Nicolas Hulot., 0.7},' '{Nicolas Hulot dramatically quit Macron's cabinet on live radio., 0.6}', and '{Alexis Kohler: Secretary-general at the Elysée, he has worked closely with Mr. Macron for several years and has long acted as his special adviser., 0.3}'. Note that there is one passage 'Édouard Charles Philippe is the French prime minister. He met with Nicolas Hulot.' that appears in response to two sub-questions. Result processing engine 393 then generates a map m[x][y] that relates the question form the set of questions (x) and the passage associated with the answer to that question (y) of original passages in merged passage index 396. The map ends up with the following values:

m[0][0]=1
m[1][0]=0
m[1][1]=2
m[1][2]=1
m[2][0]=3

Notice that 'm[0][0]' and 'm[1][2]' map to the same passage—the duplicated passage mentioned above.

Now, result processing engine 393 merges the answers, taking care to update the indexes of the answer occurrences using the map m, the result being:

{Édouard Charles Philippe, 0.9, [}1, 0, 0}]},
{Bruno Le Maire, 0.85, [{0, 0, 2}]},
{Franøois Bayrou, 0.80, [{0, 0, 4}]},
{Nicolas Hulot, 0.75, [{2, 0, 0},{1, 1, 3}]},
{Alexis Kohler, 0.5, [{3, 0, 0}]},
{Édouard Charles Philippe, 0.1, [{2, 0, 0}]}
{Elysée, 0.1, [{3, 0, 4}]}

Notice that the two instances of Nicolas Hulot from different sub-questions are merged. Result processing engine 393 then provides this factoid question response report to the confidence merging and ranking stage 370 so as to replace the normal operations provided by the confidence merging and ranking stage 370 and thus, be utilized in a final set of candidate answers and confidence scores stage 380 to produce a final answer and confidence score, or final set of candidate answers and confidence scores, which are output to the submitter of the original input question via a graphical user interface or other mechanism for outputting information.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
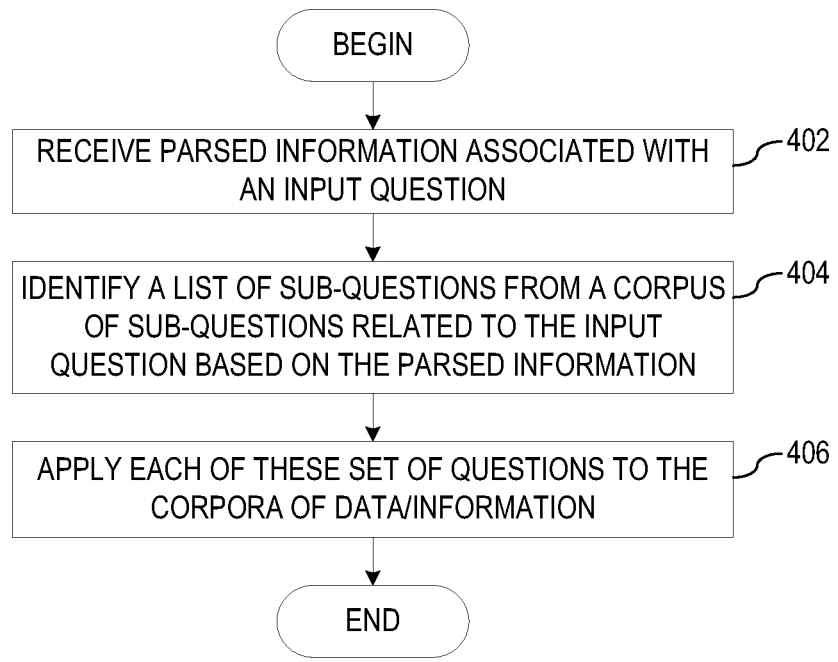
FIG. 4 depicts one example the operation performed by an input question enhancement mechanism in identifying a set of sub-questions related to an input question in accordance with an illustrative embodiment.

FIG. 4 depicts one example the operation performed by an input question enhancement mechanism in identifying a set of sub-questions related to an input question in accordance with an illustrative embodiment. As the operation begins, the input question enhancement mechanism receives parsed information associated with an input question (step 402) the parsed information identifying major features from the input question and a classification of the major features according to types, e.g., names, dates, or any of a plethora of other defined topics. The input question enhancement mechanism identifies a list of sub-questions from a corpus of sub-questions related to the input question based on the parsed information (step 404) thereby forming a set of questions to be posed to a corpus of data/information in order to generate one or more hypotheses. The input question enhancement mechanism then applies each of these set of questions to the corpora of data/information (step 406) through a hypothesis generation stage of a QA system to which the input question enhancement mechanism is associated. The operation terminates thereafter.

Figure 5A:
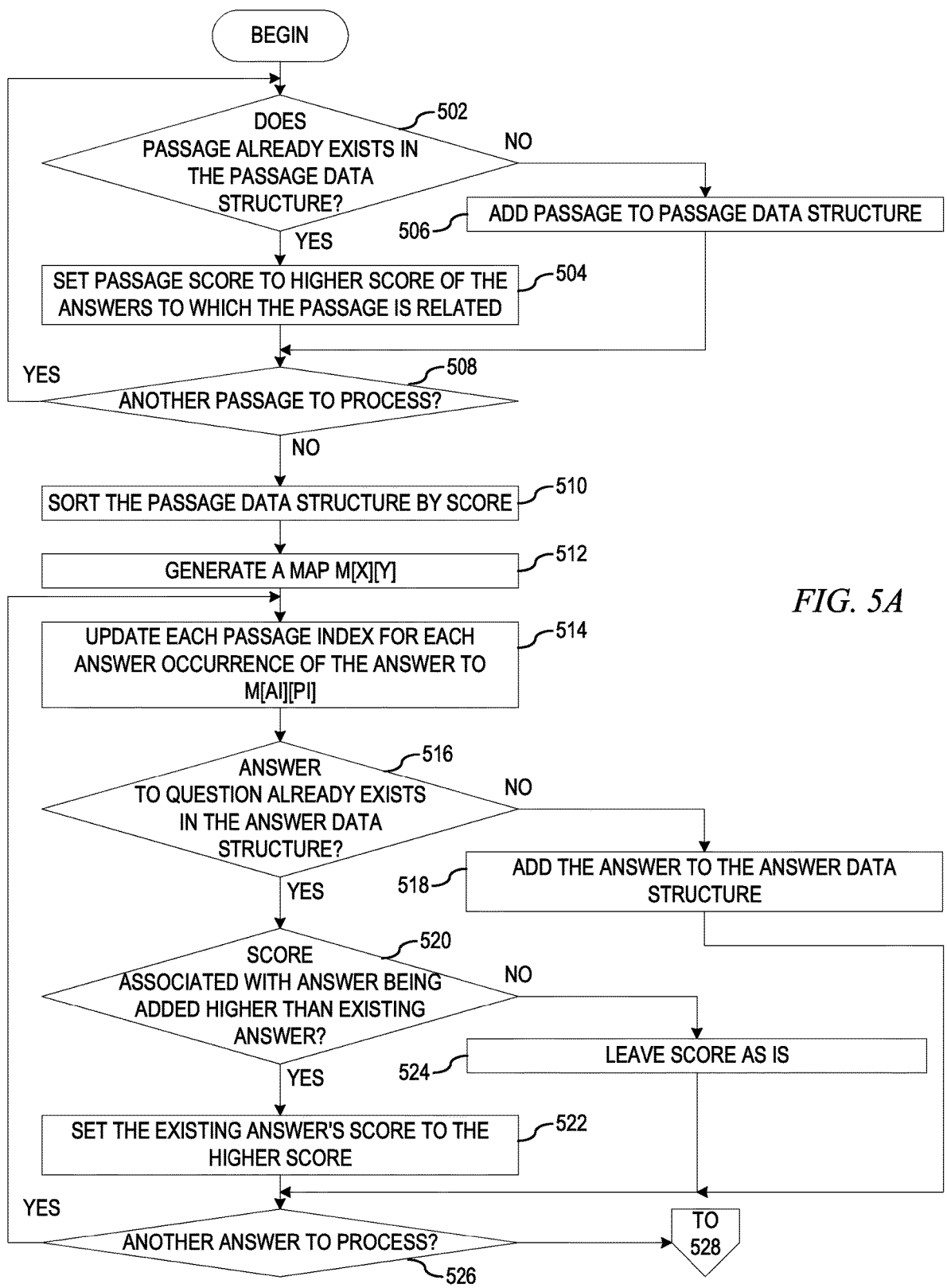
FIGS. 5A and 5B depict one example the operation performed by an input question enhancement mechanism in analyzing answers and passages obtained as a result processing the set of sub-questions related to an input question in accordance with an illustrative embodiment.
Figure 5B:
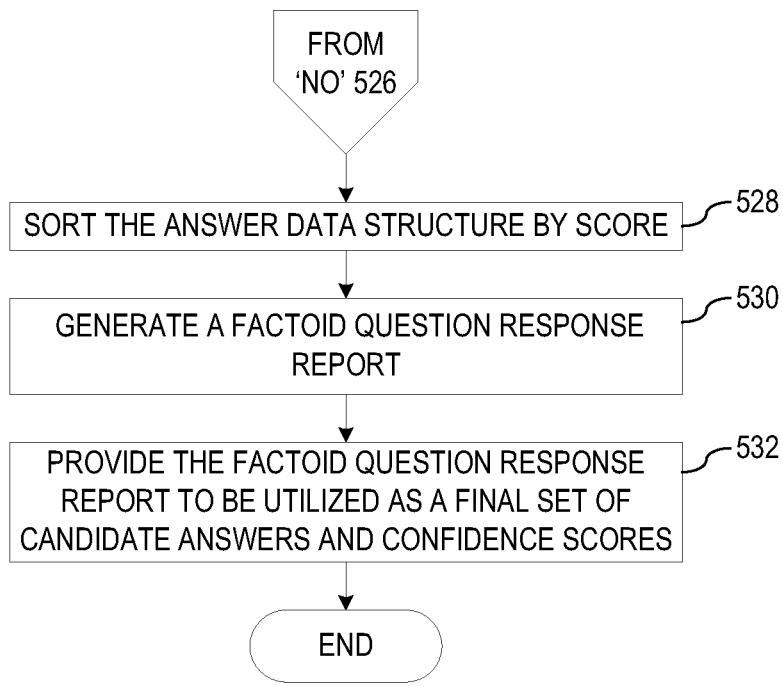

FIGS. 5A and 5B depict one example the operation performed by an input question enhancement mechanism in analyzing answers and passages obtained as a result processing the set of sub-questions related to an input question in accordance with an illustrative embodiment. As a result of applying each of the set of questions results in the extraction of portions of the corpus of data/information matching the criteria of the particular query, these portions of the corpus are then analyzed and used to generate hypotheses for answering the question, i.e. "candidate answers". Upon receiving each of these candidate answers and supporting passages, the input question enhancement mechanism stores a set of answers in an answer data structure and stores the set of related passages related to the set of answers in a passage data structure. Initially, the answer data structure and the passage data structure are empty. Thus, as the operation begins, the input question enhancement mechanism determines whether the passage already exists in the passage data structure (step 502). If at step 502 the input question enhancement mechanism determines that the associated passage already exists in the passage data structure, then the input question enhancement mechanism sets that passage in the passage data structure to have the higher score between itself and the answer as well as any other answer associated with the passage (step 504). If at step 502 the input question enhancement mechanism determines that the associated passage fails to exist in the passage data structure, the input question enhancement mechanism adds the associated passage to the passage data structure (step 506).

From steps 504 and 506, the input question enhancement mechanism then determines whether there is another passage to process (step 508). If at step 508 the input question enhancement mechanism determines that there is another passage to process, the operation returns to step 502. If at step 508 the input question enhancement mechanism determines that there is not another passage to process, the input question enhancement mechanism sorts the passage data structure by score (step 510) and generates a map m[x][y] that relates the question form the set of questions (x) and the passage associated with the answer to that question (y) of original passages in a merged passage index (step 512).

The input question enhancement mechanism then tors to the answers associated with the results. As the input question enhancement mechanism adds each answer to the answer data structure, the input question enhancement mechanism updates each passage index for each answer occurrence of the answer to m[ai][pi], where ai is the index of the answer in the answer data structure and pi is the original passage index for this answer in the merged passage index (step 514). The input question enhancement mechanism then determines whether an answer to a question from the set of questions already exists in the answer data structure (step 516). If at step 516 the input question enhancement mechanism determines that an answer to a question from the set of questions fails to exist in the answer data structure, the input question enhancement mechanism adds the answer to the answer data structure (step 518). If at step 516 the input question enhancement mechanism determines that an answer to a question from the set of questions already exists in the answer data structure, the input question enhancement mechanism determines whether a score associated with that answer being added is higher than the answer already existing in the answer data structure (step 520). If at step 520 the input question enhancement mechanism determines that a score associated with the answer being added is higher, then the input question enhancement mechanism sets the existing answer's score in the answer data structure to the higher score (step 522). If at step 520 the input question enhancement mechanism determines that the answer's score being added fails to be higher, then the input question enhancement mechanism leaves the score of the existing answer's as is (step 524).

From steps 518, 522, and 524, the input question enhancement mechanism then determines whether there is another answer to process (step 526). If at step 526 the input question enhancement mechanism determines that there is another answer to process, the operation returns to step 514. If at step 526 the input question enhancement mechanism determines that there is not another answer to process, the input question enhancement mechanism sorts the answer data structure by score (step 528). The input question enhancement mechanism then generates a factoid question response report with answers from the answer data structure and passages from the passage data structure (step 530). The input question enhancement mechanism then provides the factoid question response report to be utilized as a final set of candidate answers and confidence scores (step 532), which are output to the submitter of the original input question via a graphical user interface or other mechanism for outputting information. The operation terminates thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for employing a set of sub-questions that are identified as being related to the input question. The QA system then operates to answer each sub-question separately and merge the results, i.e. the answer to each sub-question into a single report so the most relevant information is easily accessible. By performing such operations, the illustrative embodiments improve the answering capabilities of QA systems such that differently phrased reference documents rich with pragmatic implications from the corpus of reference documents provide an accurate answer to the input question.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, comprising at least one processor and at least one memory, wherein the at least one memory comprises instructions that are executed by the at least one processor to configure the at least one processor to implement an input question enhancement mechanism for merging sub-question results in Question and Answer (QA) systems in order to answer an input question submitted from a user, the method comprising:
   identifying a plurality of sub-questions associated with the input question;
   responsive to submitting the set of questions to a QA pipeline of the QA system, receiving a set of answers and a set of passages related to the set of answers corresponding to each of the plurality of sub-questions;
   applying a mapping to the set of passages to form a consolidated set of passages;
   merging the set of answers into the mapping so as to generate a consolidated set of answers;
   generating a factoid question response report with answers from the consolidated set of answers and passages from the consolidated set of passages; and
   providing the factoid question response report to the user, wherein, in receiving the set of passages related to the set of answers corresponding to each of the plurality of sub-questions, the method further comprises:
   for each passage in the set of passages:
      determining whether the passage exists in a passage data structure;
      responsive to the passage already existing in the passage data structure, increasing a score between the passage and an answer associated with the passage and increasing a score between the passage and any other answer associated with the passage; and
      responsive to the passage failing to exist in the passage data structure, adding the passage to the passage data structure and setting the score between the passage and the answer associated with the passage to an initial value; and
   responsive to all the passages in the set of passages being analyzed, sorting the passage data structure score and using the scores in applying the mapping to the set of passages to form the consolidated set of passages.

2. The method of claim 1, wherein the plurality of sub-questions associated with the input question are identified from a corpus of sub-questions identified as being related to the input question based on the parsing information.

3. The method of claim 1, wherein, in receiving the set of answers corresponding to each of the plurality of sub-questions, the method further comprises:
   for each answer in the set of answers:
      determining whether the answer exists in an answer data structure;
      responsive to the answer already existing in the answer data structure:
         determining whether a QA pipeline assigned score associated with the answer being added is higher than the answer already existing in the answer data structure;
         responsive to the score associated with the answer being added is higher, setting an existing answer's score in the answer data structure to the higher score; and
         responsive to the score associated with the answer failing to be higher, leaving the existing answer's score as is; and
      responsive to the answer failing to exist in the answer data structure, adding the answer with its QA pipeline assigned score to the answer data structure; and
   sorting the answer data structure by score to form the consolidated set of answers.

4. The method of claim 1, wherein generating the factoid question response report with answers from the consolidated set of answers and passages from the consolidated set of passages utilizes a sorted scoring associated with the consolidated set of answers.

5. The method of claim 1, wherein in applying the mapping to the set of passages to form the consolidated set of passages further comprises:
   forming a count of each passage of the consolidated set of passages.

6. The method of claim 1, wherein merging the set of answers into the mapping so as to generate the consolidated set of answers further comprises:
   generating a count of the consolidated set of answers.

7. A computer program product comprising a computer readable storage medium having a computer readable program stored therein, wherein the computer readable program, when executed on a data processing system, causes the data processing system to implement an input question enhancement mechanism for merging sub-question results in Question and Answer (QA) systems in order to answer an input question, and further causes the data processing system to:

identify a plurality of sub-questions associated with the input question;

responsive to submitting the set of questions to a QA pipeline of the QA system, receive a set of answers and a set of passages related to the set of answers corresponding to each of the plurality of sub-questions;

apply a mapping to the set of passages to form a consolidated set of passages;

merge the set of answers into the mapping so as to generate a consolidated set of answers;

generate a factoid question response report with answers from the consolidated set of answers and passages from the consolidated set of passages; and provide the factoid question response report to the user, wherein, in the computer readable program receiving the set of passages related to the set of answers corresponding to each of the plurality of sub-questions, the computer readable program further causes the data processing system to:

for each passage in the set of passages:

determine whether the passage exists in a passage data structure;

responsive to the passage already existing in the passage data structure, increase a score between the passage and an answer associated with the passage and increasing a score between the passage and any other answer associated with the passage; and responsive to the passage failing to exist in the passage data structure, add the passage to the passage data structure and setting the score between the passage and the answer associated with the passage to an initial value; and responsive to all the passages in the set of passages being analyzed, sort the passage data structure score and using the scores in applying the mapping to the set of passages to form the consolidated set of passages.

8. The computer program product of claim 7, wherein the plurality of sub-questions associated with the input question are identified from a corpus of sub-questions identified as being related to the input question based on the parsing information.

9. The computer program product of claim 7, wherein, in the computer readable program receiving the set of answers corresponding to each of the plurality of sub-questions, the computer readable program further causes the data processing system to:

for each answer in the set of answers:

determine whether the answer exists in an answer data structure;

responsive to the answer already existing in the answer data structure:

determine whether a QA pipeline assigned score associated with the answer being added is higher than the answer already existing in the answer data structure;

responsive to the score associated with the answer being added is higher, set an existing answer's score in the answer data structure to the higher score; and responsive to the score associated with the answer failing to be higher, leave the existing answer's score as is; and responsive to the answer failing to exist in the answer data structure, add the answer with its QA pipeline assigned score to the answer data structure; and sort the answer data structure by score to form the consolidated set of answers.

10. The computer program product of claim 7, wherein the computer readable program generating the factoid question response report with answers from the consolidated set of answers and passages from the consolidated set of passages further causes the data processing system to utilize a sorted scoring associated with the consolidated set of answers.

11. The computer program product of claim 7, wherein the computer readable program to apply the mapping to the set of passages to form the consolidated set of passages further causes the data processing system to:

form a count of each passage of the consolidated set of passages.

12. The computer program product of claim 7, wherein the computer readable program to merge the set of answers into the mapping so as to generate the consolidated set of answers further causes the data processing system to:

generate a count of the consolidated set of answers.

13. An apparatus comprising:

at least one processor; and at least one memory coupled to the at least one processor, wherein the at least one memory comprises instructions which, when executed by the at least one processor, cause the at least one processor to implement an input question enhancement mechanism for merging sub-question results in Question and Answer (QA) systems in order to answer an input question, and further cause the at least one processor to:

identify a plurality of sub-questions associated with the input question;

responsive to submitting the set of questions to a QA pipeline of the QA system, receive a set of answers and a set of passages related to the set of answers corresponding to each of the plurality of sub-questions;

apply a mapping to the set of passages to form a consolidated set of passages;

merge the set of answers into the mapping so as to generate a consolidated set of answers;

generate a factoid question response report with answers from the consolidated set of answers and passages from the consolidated set of passages; and provide the factoid question response report to the user, wherein, in the instructions receiving the set of passages related to the set of answers corresponding to each of the plurality of sub-questions, the instructions further cause the at least one processor to:

for each passage in the set of passages:

determine whether the passage exists in a passage data structure;

responsive to the passage already existing in the passage data structure, increase a score between the passage and an answer associated with the passage and increasing a score between the passage and any other answer associated with the passage; and responsive to the passage failing to exist in the passage data structure, add the passage to the passage data structure and setting the score between the passage and the answer associated with the passage to an initial value; and responsive to all the passages in the set of passages being analyzed, sort the passage data structure score and using the scores in applying the mapping to the set of passages to form the consolidated set of passages.

14. The apparatus of claim 13, wherein the plurality of sub-questions associated with the input question are identified from a corpus of sub-questions identified as being related to the input question based on the parsing information.

15. The apparatus of claim 13, wherein, in the instructions receiving the set of answers corresponding to each of the plurality of sub-questions, the instructions further cause the at least one processor to:

for each answer in the set of answers:
  determine whether the answer exists in an answer data structure;
    responsive to the answer already existing in the answer data structure:
      determine whether a QA pipeline assigned score associated with the answer being added is higher than the answer already existing in the answer data structure;
      responsive to the score associated with the answer being added is higher, set an existing answer's score in the answer data structure to the higher score; and
      responsive to the score associated with the answer failing to be higher, leave the existing answer's score as is; and
    responsive to the answer failing to exist in the answer data structure, add the answer with its QA pipeline assigned score to the answer data structure; and
  sort the answer data structure by score to form the consolidated set of answers.

16. The apparatus of claim 13, wherein the instructions generating the factoid question response report with answers from the consolidated set of answers and passages from the consolidated set of passages further cause the at least one processor to utilize a sorted scoring associated with the consolidated set of answers.

17. The apparatus of claim 13, wherein the instructions to apply the mapping to the set of passages to form the consolidated set of passages further cause the at least one processor to:

form a count of each passage of the consolidated set of passages.

18. The apparatus of claim 13, wherein the instructions to merge the set of answers into the mapping so as to generate the consolidated set of answers further cause the at least one processor to:

generate a count of the consolidated set of answers.

\* \* \* \* \*